United States Patent
Lim et al.

(10) Patent No.: US 12,000,860 B2
(45) Date of Patent: Jun. 4, 2024

(54) WHEEL SPEED SENSOR HAVING MULTIPLE SENSING UNITS AND WHEEL BEARING COMPRISING SAME

(71) Applicant: ILJIN GLOBAL Co., Ltd, Seoul (KR)

(72) Inventors: Jae Wan Lim, Seoul (KR); Young Tae Kim, Seoul (KR); Chan Goo Jeon, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 1 day.

(21) Appl. No.: 17/509,274

(22) Filed: Oct. 25, 2021

(65) Prior Publication Data
US 2022/0043018 A1    Feb. 10, 2022

Related U.S. Application Data

(63) Continuation of application No. PCT/KR2020/005399, filed on Apr. 23, 2020.

(30) Foreign Application Priority Data

Apr. 23, 2019 (KR) ........................ 10-2019-0047580

(51) Int. Cl.
  *G01P 3/54* (2006.01)
  *B60B 27/00* (2006.01)
  (Continued)

(52) U.S. Cl.
  CPC .......... *G01P 3/481* (2013.01); *B60B 27/0005* (2013.01); *B60B 27/0068* (2013.01); *G01P 1/026* (2013.01)

(58) Field of Classification Search
  CPC .......... G01P 3/443; G01P 3/481; G01P 3/488; G01P 3/487; G01P 3/685; G01P 1/026;
  (Continued)

(56) References Cited

U.S. PATENT DOCUMENTS 5,920,193 A     7/1999   Tola et al.
10,816,360 B2 * 10/2020  Onimoto .............. G01D 5/2451
(Continued)

FOREIGN PATENT DOCUMENTS

CN      109649082 A     4/2019
JP      2006283976 A    10/2006
(Continued)

OTHER PUBLICATIONS

International Search Report of PCT/KR2020/005399 dated Jul. 27, 2020.

*Primary Examiner* — Thang X Le
(74) *Attorney, Agent, or Firm* — Dinsmore & Shohl LLP; Yongsok Choi, Esq.

(57) ABSTRACT

A wheel speed sensor mounted on a wheel bearing to detect a rotational speed of a wheel is provided. The wheel speed sensor according to an embodiment of the present disclosure may comprise: a housing having a sensing module provided therein; a first sensing module configured to detect a rotational speed of the wheel and to output a first detection signal to an outside; and a second sensing module configured to detect a rotational speed of the wheel independently of the first sensing module and to output a second detection signal to the outside. According to an embodiment of the present disclosure, the first sensing module may comprise a first sensing part configured to detect a rotational speed of the wheel, and the second sensing module may comprise a second sensing part configured to detect a rotational speed of the wheel.

8 Claims, 11 Drawing Sheets

(51) Int. Cl.
  *G01P 1/02* (2006.01)
  *G01P 3/481* (2006.01)
(58) Field of Classification Search
  CPC ... G01P 3/66; G01P 3/68; G01P 3/665; G01D 5/145; G01D 5/147; G01D 5/2457; G01D 5/2013; G01D 5/2046; G01B 7/30; G01B 7/003; G01B 7/14
  See application file for complete search history.

(56) References Cited

U.S. PATENT DOCUMENTS

| | | | | |
|---|---|---|---|---|
| 2009/0146510 | A1* | 6/2009 | Uchimura | H02K 7/1166 310/68 B |
| 2009/0315544 | A1* | 12/2009 | Takahashi | G01P 3/446 702/155 |
| 2011/0120798 | A1* | 5/2011 | Kawada | B62D 5/0409 180/444 |
| 2013/0099107 | A1* | 4/2013 | Omoto | G01D 5/26 384/129 |
| 2014/0002066 | A1* | 1/2014 | Barcat | G01P 3/487 312/223.1 |
| 2016/0164305 | A1* | 6/2016 | Maurer | B23B 31/28 320/108 |
| 2017/0153265 | A1* | 6/2017 | Yamamoto | G01P 3/443 |

FOREIGN PATENT DOCUMENTS

| | | | |
|---|---|---|---|
| JP | 2017096828 | A | 6/2017 |
| KR | 1020180108238 | A | 10/2018 |

\* cited by examiner

PRIOR ART

WHEEL SPEED SENSOR HAVING MULTIPLE SENSING UNITS AND WHEEL BEARING COMPRISING SAME

CROSS REFERENCE TO RELATED APPLICATIONS

This application is a continuation of International Patent Application No. PCT/KR2020/005399 filed on Apr. 23, 2020, which claims priority to Korean Patent Application No. 10-2019-0047580 filed on Apr. 23, 2019, the entire contents of which are herein incorporated by reference.

TECHNICAL FIELD

The present disclosure relates to a wheel speed sensor mounted on a wheel bearing and configured to detect a rotational speed of a wheel, and a wheel bearing provided with the same, and more specifically, to a wheel speed sensor comprising a plurality of sensing parts that operate independently of each other to provide an improved detection reliability and a redundancy of the sensor, and a wheel bearing provided with the same.

BACKGROUND ART

Recent vehicles are equipped with various control systems to have improved drivability and stability. Various sensors are mounted and used to provide information about operational states of the vehicle to such control systems.

As an example of sensors provided in a vehicle, a wheel speed sensor (WSS) for detecting a rotational speed of a wheel of the vehicle is mounted on a wheel bearing that supports the wheel and used. Information about the rotational speed of the wheel detected by the wheel speed sensor is transmitted to an electronic control unit (ECU) or the like and used to operate a control system such as an anti-locking brake system (ABS), an electronic control system (ECS) or the like.

Referring to FIGS. 1 and 2, a wheel speed sensor for detecting a rotational speed of a wheel and a wheel bearing provided with the same are exemplarily illustrated. As illustrated in FIG. 1, a wheel bearing 10 having the wheel speed sensor may be configured such that a rotary element (a wheel hub 20 and an inner ring 30) are connected to a non-rotary element 40 (outer ring) through rolling bodies 50 and thus a wheel coupled to the rotary element is rotatably mounted and supported on a vehicle body connected to the non-rotary element. A wheel speed sensor 60 may be configured to be provided on one side of the wheel bearing 10 and to detect the rotational speed of the wheel.

Conventionally, in the wheel speed sensor 60, a sensing part 64 is configured to be positioned adjacent to a sensor target 70 (for example, an encoder) mounted on the rotary element (for example, the inner ring 30) and rotating together with the wheel, and to detect the rotational speed of the wheel by detecting a change in magnetic field generated due to the rotating sensor target 70. Information about the rotational speed of the wheel detected by the wheel speed sensor 60 may be transmitted to an ECU or the like of the vehicle and used to operate a control system such as an ABS, an ECS or the like.

In the meantime, as illustrated in FIG. 2, the wheel speed sensor 60 may be formed to have a structure in which the sensing part 64 is provided in a housing 62 mounted on one side of the wheel bearing 10, and may be configured to sense a change in magnetic field caused due to the rotation of the sensor target 70 using the sensing part 64 to detect the rotational speed of the wheel. Further, the wheel speed sensor 60 may be configured such that a terminal portion, which extends from the sensing part 64 or is connected to the sensing part 64, is exposed to the outside through a connector part 66 formed on the housing 62 and is connected to a cable or the like, thereby transmitting information about the detected rotational speed to an external controller or the like.

Incidentally, since the wheel speed sensor 60 mounted on the wheel bearing 10 is conventionally configured to detect a rotational speed of the wheel using a single sensing part, when an abnormality occurs in the single sensing part, a terminal portion connected to the single sensing part, or the like, accurate information about the rotational speed of the wheel may not be provided. As a result, a vehicle control system such as an ABS cannot be stably controlled, and thus an abnormality such as an unstable vehicle posture or loss of steering ability during braking may occur.

Particularly, in the case of autonomous vehicles, which have recently attracted attention, since most of vehicle driving controls are performed by a control system, when there is an abnormality in an operation of the vehicle, it may be difficult to immediately respond to the abnormality. Therefore, abnormalities occurring in the wheel speed sensor or the like may cause a more serious risk to the driving of the vehicle.

SUMMARY

Technical Problem

The present disclosure is to solve the aforementioned conventional problems, and an object of the present disclosure is to provide a wheel speed sensor which is mounted on a wheel bearing and configured to have a plurality of sensing parts that operate independently of each other, which is capable of detecting a rotational speed of a wheel by another sensing part even if an abnormality occurs in any one sensing part among the plurality of sensing parts, thereby improving an operational reliability and securing a redundancy, and a wheel bearing provided with such a wheel speed sensor.

Technical Solution

Representative configurations of the present disclosure for achieving the above object are as follows.

According to an embodiment of the present disclosure, there may be provided a wheel speed sensor mounted on a wheel bearing to detect a rotational speed of a wheel. The wheel speed sensor according to an embodiment of the present disclosure may comprise: a housing having a sensing module provided therein; a first sensing module configured to detect a rotational speed of the wheel and to output a first detection signal to an outside; and a second sensing module configured to detect a rotational speed of the wheel independently of the first sensing module and to output a second detection signal to the outside. According to an embodiment of the present disclosure, the first sensing module may comprise a first sensing part configured to detect a rotational speed of the wheel, and the second sensing module may comprise a second sensing part configured to detect a rotational speed of the wheel.

According to an embodiment of the present disclosure, the first sensing part of the first sensing module may be accommodated in a first insert body, the second sensing part of the second sensing module may be accommodated in a second insert body, and the first insert body and the second insert body may be formed separately from each other. According to an embodiment of the present disclosure, the housing may comprise a first connector part configured to expose an end portion of the first sensing module to the outside and a second connector part configured to expose an end portion of the second sensing module to the outside, and the first connector part and the second connector part may be formed separately from each other.

According to an embodiment of the present disclosure, the first sensing part of the first sensing module and the second sensing part of the second sensing module may be accommodated in one insert body. According to an embodiment of the present disclosure, the housing may comprise a first connector part configured to expose an end portion of the first sensing module to the outside and a second connector part configured to expose an end portion of the second sensing module to the outside, and the first connector part and the second connector part may be formed separately from each other.

According to an embodiment of the present disclosure, the first sensing part of the first sensing module may be accommodated in a first insert body, the second sensing part of the second sensing module may be accommodated in a second insert body, and the first insert body and the second insert body may be formed separately from each other. According to an embodiment of the present disclosure, the first sensing module and the second sensing module may be configured such that end portions thereof are exposed to the outside through one connector part formed in the housing.

According to an embodiment of the present disclosure, the first sensing part of the first sensing module and the second sensing part of the second sensing module may be accommodated in one insert body, and the first sensing module and the second sensing module may be configured such that end portions thereof are exposed to the outside through one connector part formed in the housing.

According to an embodiment of the present disclosure, the housing may be formed in a cylindrical cap shape with one side opened.

According to an embodiment of the present disclosure, each of the first sensing part and the second sensing part may comprise: a sensor disposed adjacent to a sensor target attached to a rotary element of the wheel bearing and configured to detect a change in magnetic field; and a plurality of lead terminals extending from the sensor.

According to an embodiment of the present disclosure, the sensor provided in each of the first sensing part and the second sensing part may comprise any one of a Hall sensor, an anisotropic magneto-resistance sensor, and a giant magneto-resistance sensor.

According to an embodiment of the present disclosure, the first sensing module may further comprise a first terminal portion electrically connected to the first sensing part, and the second sensing module may further comprise a second terminal portion electrically connected to the second sensing part.

According to an embodiment of the present disclosure, each of the first terminal portion and the second terminal portion may comprise a power terminal and a signal terminal. According to an embodiment of the present disclosure, any one lead terminal of the plurality of lead terminals provided in each of the first sensing part and the second sensing part may be electrically connected to the power terminal provided in each of the first terminal portion and the second terminal portion, and the other lead terminal of the plurality of lead terminals provided in each of the first sensing part and the second sensing part may be electrically connected to the signal terminal provided in each of the first terminal portion and the second terminal portion.

According to an embodiment of the present disclosure, there may be provided a wheel bearing comprising the above-described wheel speed sensor.

According to an embodiment of the present disclosure, the wheel bearing may be configured to rotatably support the rotary element on which the wheel is mounted relative to a non-rotary element coupled to a vehicle body through rolling bodies.

According to an embodiment of the present disclosure, the wheel speed sensor may be mounted on and fixed to the non-rotary element coupled to the vehicle body.

According to an embodiment of the present disclosure, the wheel bearing may further comprise a sensor target mounted on the rotary element of the wheel bearing to generate a change in magnetic field while rotating together with the wheel.

Further, the wheel speed sensor and the wheel bearing provided with the same according to the present disclosure may further comprise other additional configurations without departing from the technical sprit of the present disclosure.

Advantageous Effects

The wheel speed sensor according to an embodiment of the present disclosure comprises a plurality of sensing parts that operate independently of each other. Accordingly, the wheel speed sensor is capable of detecting a rotational speed of a wheel by another sensing part even if an abnormality occurs in any one sensing part among the plurality of sensing parts. Thus, it is possible to improve operational reliability and redundancy of the wheel speed sensor, and improve an operational stability of control systems that operate based on the detected rotational speed.

In addition, the wheel speed sensor according to an embodiment of the present disclosure is configured such that a plurality of sensing parts operating independently of each other are separately accommodated in and mounted on insert bodies formed separately from each other, and/or end portions (terminal portions) of a plurality of sensing modules are exposed to the outside through separate connector parts formed separately from each other. Accordingly, even if moisture or the like flows into the insert body of any one sensing module among the plurality of sensing modules or into any one connector part among the connector parts and thus an abnormality occurs in any one sensing part among the plurality of sensing parts, another sensing part may not affected by this. It is therefore possible to further improve the redundancy and operational reliability of the wheel speed sensor.

EXPLANATION OF REFERENCE NUMERALS

Figure 1:
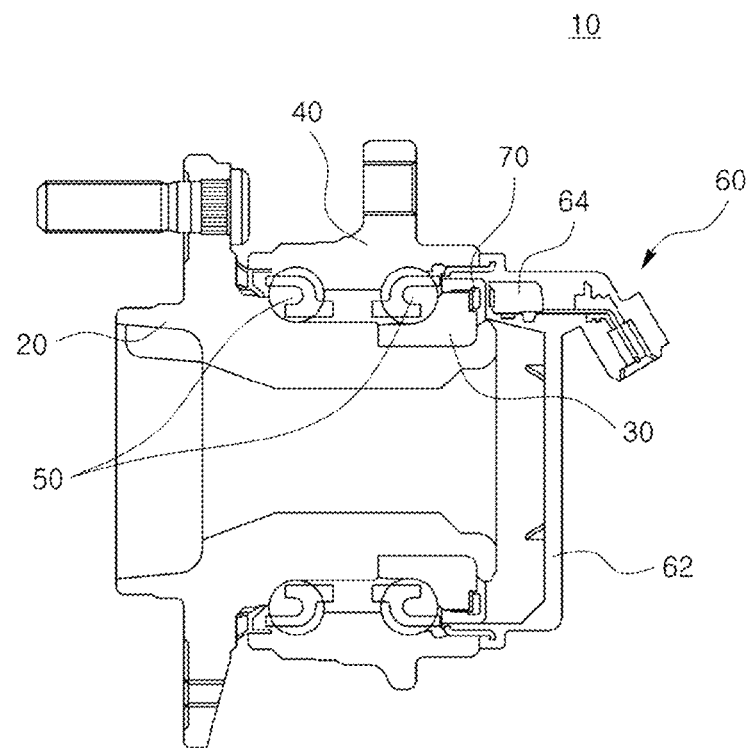
FIG. 1 exemplarily illustrates a conventional wheel bearing comprising a wheel speed sensor.
Figure 2:
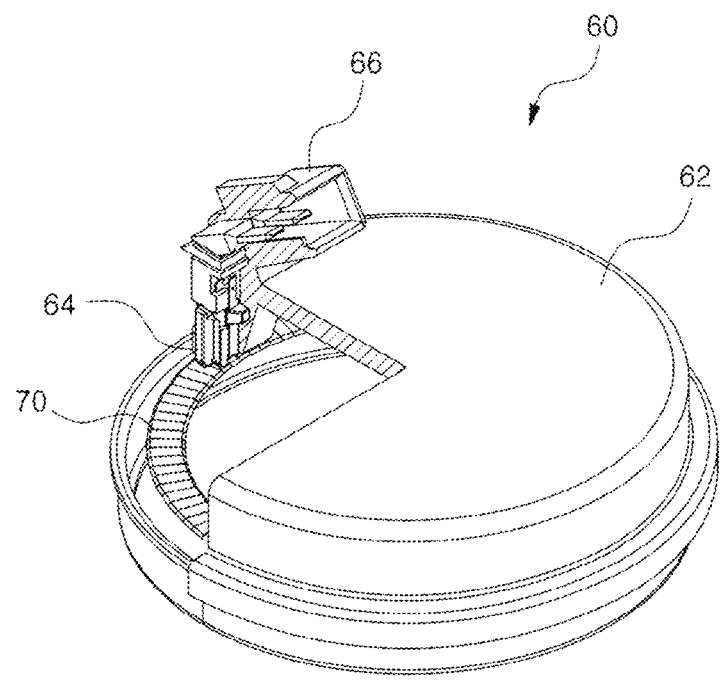
FIG. 2 exemplarily illustrates a wheel speed sensor that may be used in the wheel bearing illustrated in FIG. 1.

100: wheel speed sensor
200: housing
210: housing body portion
220: connector part
220a: first connector part
220b: second connector part
300: sensing module
310: first sensing module
320: first sensing part
330: first terminal portion
340: first insert body
350: second sensing module
360: second sensing part
370: second terminal portion
380: second insert body
390: (single) insert body
400: connector

DETAILED DESCRIPTION

Preferred embodiments of the present disclosure will be described in detail below with reference to the appended drawings to such an extent that the present disclosure can be readily carried out by one of ordinary skill in the art.

Detailed descriptions of parts irrelevant to the present disclosure will be omitted for the purpose of clearly describing the present disclosure. Throughout the specification, the same constituent elements will be described using the same reference numerals. In addition, the shapes and sizes of the respective constituent elements illustrated in the drawings are arbitrarily illustrated for the sake of convenience of description, and hence the present disclosure is not necessarily limited to the illustrated shapes and sizes. That is, it should be understood that specific shapes, structures, and characteristics described in the specification may be modified from one embodiment to various embodiments without departing from the spirit and scope of the prevent disclosure, and positions or dispositions of individual constituent elements may be modified without departing from the spirit and scope of the prevent disclosure. Therefore, detailed descriptions to be described below should be construed as non-limitative senses, and the scope of the prevent disclosure should be understood to include appended claims and their equivalents.

Wheel Speed Sensor According to an Embodiment of the Present Disclosure

Referring to FIGS. 3 to 7, a wheel speed sensor 100 according to an embodiment of the present disclosure is exemplarily illustrated. As illustrated in the drawings, the wheel speed sensor 100 according to an embodiment of the present disclosure may be formed generally similar to a conventional wheel speed sensor described above, and may be configured to sense a change in magnetic field generated due to a sensor target (an encoder, a tone wheel, or the like), which is mounted on one side of the wheel bearing and rotates together with a wheel, and detect a rotational speed of the wheel, as in the conventional wheel speed sensor.

According to an embodiment of the present disclosure, the wheel speed sensor 100 may be configured to comprise a housing 200 and a sensing module 300 provided in the housing 200. As will described below, the wheel speed sensor 100 may be configured to comprise a plurality of sensing parts (sensors) which operate independently of one another in the housing 200 so as to improve operational reliability of the wheel speed sensor 100 and secure redundancy of the wheel speed sensor 100.

According to an embodiment of the present disclosure, the housing 200 is a part that forms the entire body of the wheel speed sensor 100, and may be configured to comprise a housing body portion 210 forming the entire body and a connector part 220 which is positioned on one side of the housing body portion 210 and accommodate the sensing module 300 to be described later therein.

According to an embodiment of the present disclosure, the housing body portion 210 may be configured in a cylindrical cap shape with one side opened and may be mounted on one end portion of the wheel bearing (for example, mounted on an outer ring serving as a non-rotary element in a vehicle-body-side end portion of the wheel bearing), as in the conventional wheel speed sensor described above.

According to an embodiment of the present disclosure, the connector part 220 of the housing 200 may be configured to accommodate the sensing module 300 detecting a rotational speed of the wheel therein, and may perform a function of exposing one end portion (terminal portion) of the sensing module 300 to the outside so that the one end portion (terminal portion) is coupled to an external power supply and/or an external controller through a cable or the like.

Figure 3:
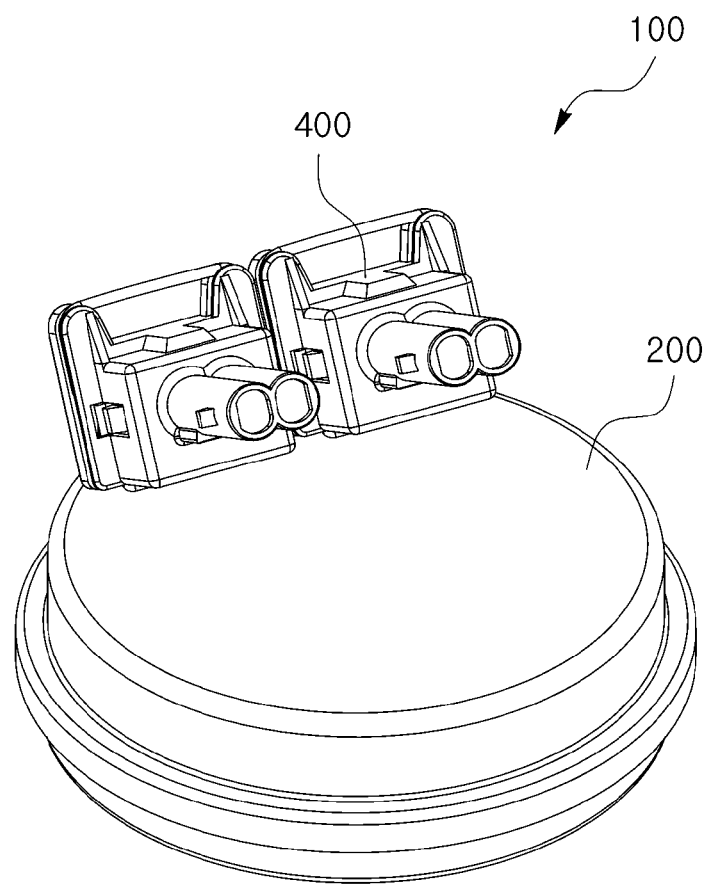
FIG. 3 exemplarily illustrates a wheel speed sensor according to an embodiment of the present disclosure (in a state in which a connector is mounted on the wheel speed sensor).
Figure 4:
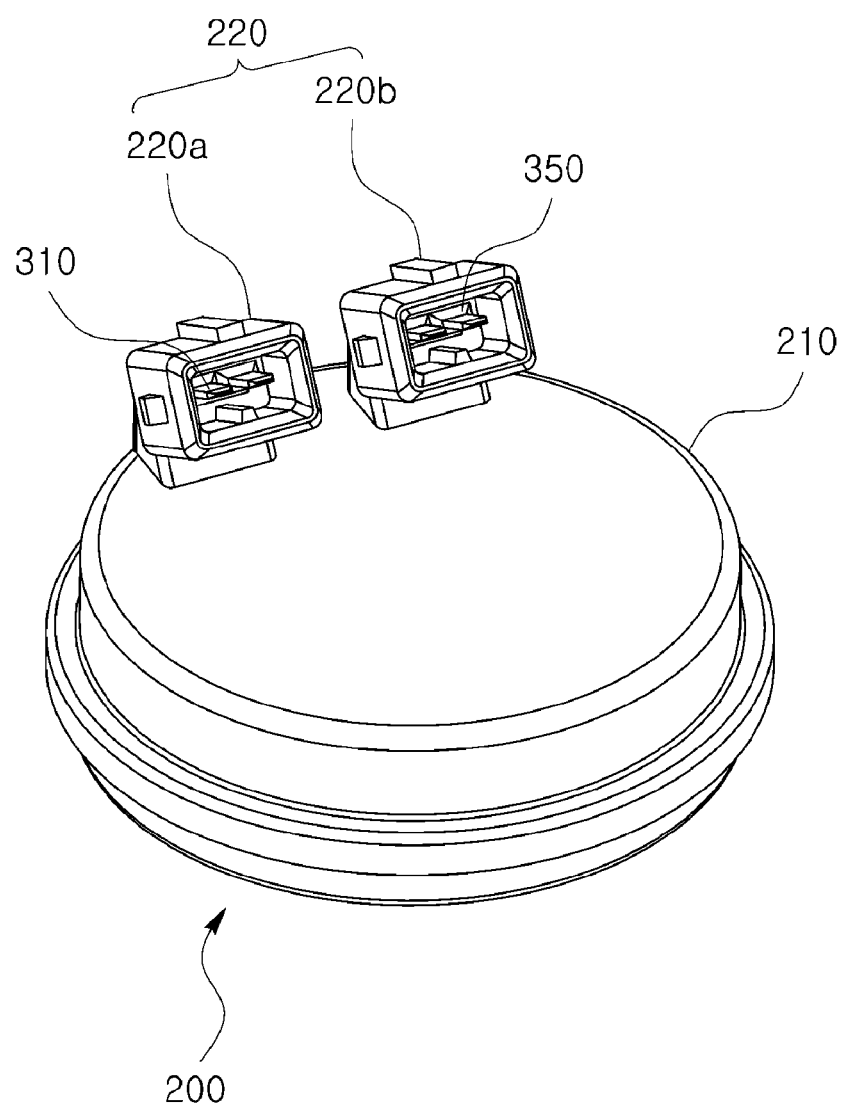
FIG. 4 exemplarily illustrates a wheel speed sensor according to an embodiment of the present disclosure.

That is, as illustrated in FIG. 4, the connector part 220 of the housing 200 may be configured so that an external end portion thereof is formed to be open such that the terminal portion of the sensing module 300 mounted thereon can be exposed to the outside. As illustrated in FIG. 3, a connector 400 on which a cable is mounted is connected to the connector part 220. Thus, the terminal portion of the sensing module 300 may be configured to be electrically coupled to the external power supply or the external controller.

According to an embodiment of the present disclosure, the housing 200 of the wheel speed sensor 100 may comprise a plurality of connector parts (a first connector part 220a and a second connector part 220b) formed separately from each other. One end portion of each of a plurality of sensing modules (for example, a terminal portion of each of the sensing modules) may be exposed to the outside through the plurality of connector parts formed separately from each other (see FIG. 4).

As such, the wheel speed sensor 100 according to an embodiment of the present disclosure is configured such that the plurality of connector parts (the first connector part 220a and the second connector part 220b) formed separately from each other are provided in the housing 200 and the terminal portions of the plurality of sensing modules are accommodated in the plurality of connector parts formed separately from each other while exposed to the outside. Accordingly, even if moisture or the like flows in through any one connector part and an abnormality occurs in the sensing module accommodated in the respective connector part, the sensing module accommodated in the other connector part may not be affected by such an abnormality. This makes it possible to improve the redundancy and operational reliability of the wheel speed sensor. In addition, since the connector parts have the separated structure, even if an abnormality occurs in any one connector part, the wheel speed sensor may be normally operated by the other connector part and the sensing module connected to the other connector part. This secures the redundancy of the connector part. In the present specification, the expression "the plurality of connector parts separated from each other are provided in the housing" means that opening portions of the plurality of connector parts through which the terminal portions of the sensing modules are exposed to the outside are formed in a plurality of areas while separated from each other (see FIG. 4), and the expression "one connector part is provided in the housing" means that opening portion through which the terminal portions of the sensing modules are exposed to the outside is formed in a single integrated structure (see FIG. 11).

According to an embodiment of the present disclosure, the sensing module 300 is provided in the housing 200 and may perform a function of detecting the rotational speed of the wheel and transmitting information about the detected rotational speed to an external device (not illustrated) such as an electronic control unit (ECU).

According to an embodiment of the present disclosure, the sensing module 300 may be configured to comprise a plurality of sensing modules (a first sensing module 310 and a second sensing module 350) which operate independently of each other, detect the rotational speed of the wheel, and output the detected rotational speed information to the outside. As will be described below, sensing parts provided in the sensing module are accommodated in insert bodies formed separately from each other, respectively.

According to an embodiment of the present disclosure, the first sensing module 310 may be configured to include a first sensing part 320 disposed adjacent to a sensor target M (for example, an encoder) which is mounted on the rotary element of the wheel bearing and rotates together with the wheel and detects the rotational speed of the wheel, and a first terminal portion 330 electrically connected to the first sensing part 320.

Figure 6:
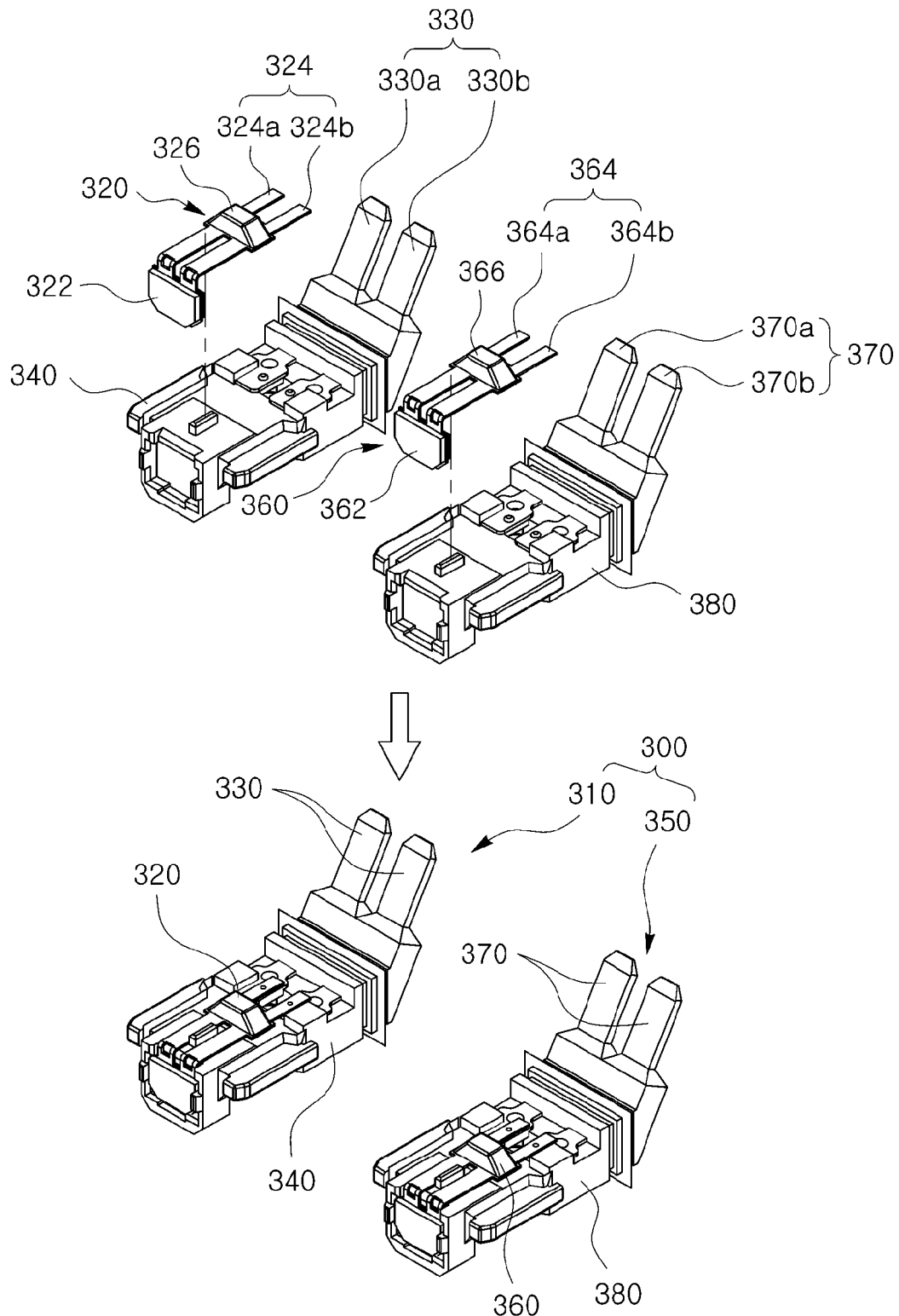
FIG. 6 exemplarily illustrates a state in which sensing modules are formed by accommodating a plurality of sensing parts in insert bodies formed separately from each another in the wheel speed sensor illustrated in FIGS. 3 and 4.

According to an embodiment of the present disclosure, the first sensing part 320 is a part that senses a change in magnetic field generated due to the sensor target M rotating together with the wheel to detect the rotational speed of the wheel, and may be configured to comprise a first sensor 322 disposed adjacent to the sensor target M and a first lead terminal 324 extending from the first sensor 322 and electrically connected to a first terminal portion 330 (to be described later) (see FIG. 6).

According to an embodiment of the present disclosure, the first sensor 322 may be configured of a Hall sensor, an anisotropic magneto-resistance (AMR) sensor, a giant magneto-resistance (GMR) sensor, or the like, and may detect a change in magnetic field generated due to the rotation of the sensor target M.

According to an embodiment of the present disclosure, the first lead terminal 324 is a part for electrically connecting the first sensor 322 to the external power supply or the external controller, and may be configured to extend in one direction from the first sensor 322. According to an embodiment of the present disclosure, the first lead terminal 324 may comprise a plurality of lead terminals (a power terminal 324a and a signal terminal 324b) arranged to be spaced apart from each other, and may be configured such that power is supplied through one lead terminal (the power terminal 324a) and a signal detected by the first sensor 322 is supplied through the other lead terminal (the signal terminal 324b). Further, a sensor body 326 may be provided in the middle portion of the first lead terminal 324 such that the plurality of lead terminals can be stably formed and mounted.

According to an embodiment of the present disclosure, the first terminal portion 330 may perform a function of being electrically connected to the first sensing part 320 of the first sensing module 310 to transmit power and/or a signal therethrough, and may be configured to comprise a plurality of terminals corresponding to the lead terminals provided in the first sensing part 320.

Figure 7:
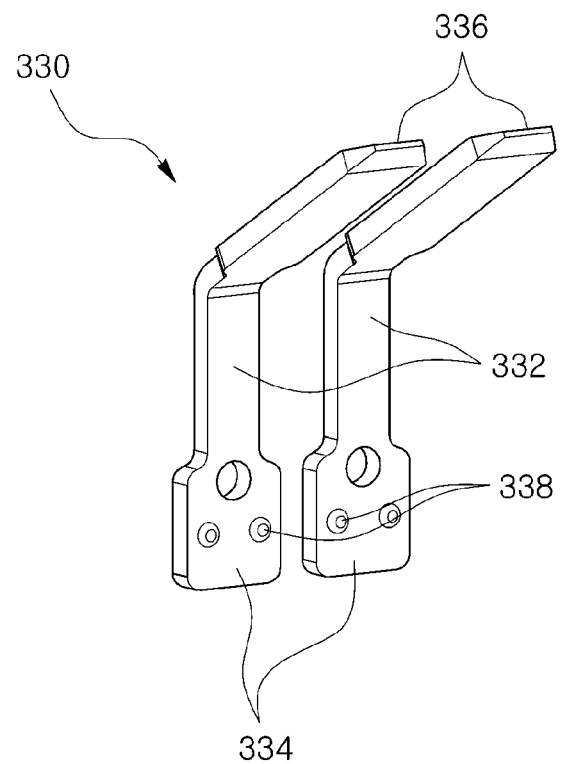
FIG. 7 exemplarily illustrates a structure of an insert terminal provided in the sensing module in the wheel speed sensor according to an embodiment of the present disclosure.

Specifically, as illustrated in FIGS. 6 and 7, the first terminal portion 330 may be formed in the form of a pair of thin and long metal plates, and may be configured to comprise a plurality of terminals including a power terminal 330a for transmitting power and a signal terminal 330b for transmitting a signal.

According to an embodiment of the present disclosure, as illustrated in FIG. 7, the plurality of terminals constituting the first terminal portion 330 may comprise a connection portion 334 provided on one side of a terminal body 332. Through the connection portion 334, the first terminal portion 330 may be configured to be electrically connected to the first lead terminal 324 of the first sensing part 320. Further, the plurality of terminals constituting the first terminal portion 330 may comprise a connection tip 336 provided on the other side of a terminal body 332. Through the connection tip 336, the first terminal portion 330 may be configured to be electrically connected to the external power supply or the external controller using a connector and/or a cable. In the meantime, the connection portion 334 may comprise a protrusion 338 formed to protrude in one direction so as to facilitate electrical contact with the first sensing part 320. The plurality of terminals provided in the first terminal portion 330 may be formed in a substantially identical or similar shape. Here, the first terminal portion 330 is not limited to the above-described shape but may be formed in various other shapes as long as it can be electrically connected to the first sensing part 320. As an example, the plurality of terminals (the power terminal and the signal terminal) may be formed in different shapes. Further, in the embodiment illustrated in the drawings, the sensing part and the terminal portion are described to be separately formed and then electrically connected to each other. However, the lead terminal of the sensing part may be extended to have a relatively long length to form the sensing module without the terminal portion (that is, the sensing part and the terminal portion may be integrated with each other).

According to an embodiment of the present disclosure, the first sensing part 320 may be configured to be accommodated in the first insert body 340 (see FIG. 6). As an example, the first insert body 340 may be configured to be formed by injection-mold or the like to partially or entirely surround the first sensing part 320 and/or the first terminal portion 330. For example, the first sensing module 310 may be configured to be formed by injection-molding the first insert body 340 together with the first terminal portion 330 and then electrically connect the first sensing part 320 to the first terminal portion 330, or by injection-molding the first insert body 340 in a state in which the first sensing part 320 and the first terminal portion 330 are electrically connected to each other.

On the other hand, the wheel speed sensor 100 according to an embodiment of the present disclosure may further comprise the second sensing module 350 configured to operate independently of the first sensing module 310. For example, the second sensing module 350 may be formed in the same or similar manner as that of the first sensing module 310, as illustrated in the drawings.

Figure 5:
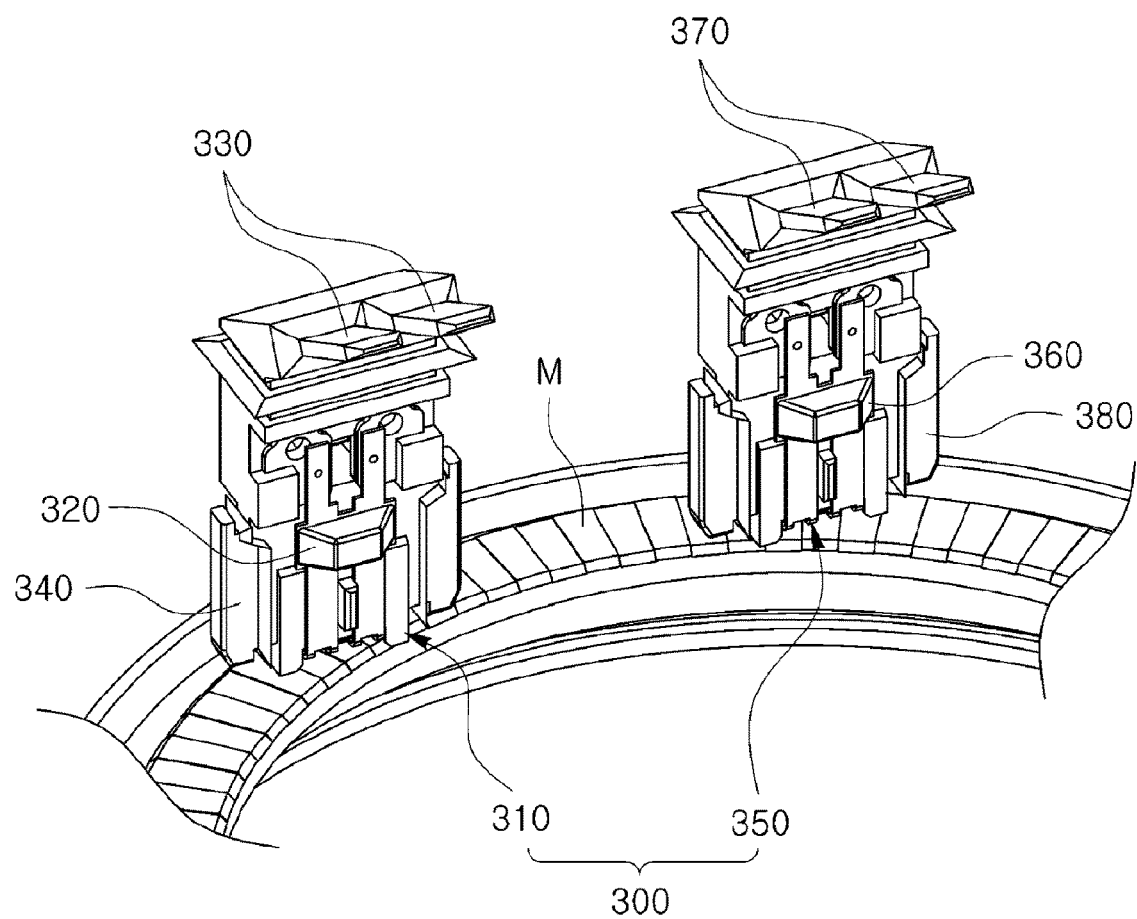
FIG. 5 exemplarily illustrates a state in which a plurality of sensing modules are disposed in the wheel speed sensor illustrated in FIGS. 3 and 4.

Specifically, as illustrated in FIGS. 5 and 6, the second sensing module 350 may comprise a second sensing part 360 disposed adjacent to the sensor target M and detect the rotational speed of the wheel, and a second terminal portion 370 electrically connected to the second sensing part 360.

The second sensing part 360 may comprise a second sensor 362 and a second lead terminal 364 extending in one direction from the second sensor 362 similarly to the first sensing part 320 described above. The second lead terminal 364 may comprise a plurality of lead terminals (a power terminal 364a and a signal terminal 364b), and a second sensor body 366 may be disposed between the plurality of lead terminals.

On the other hand, the second terminal portion 370 may be formed of a plurality of terminals (a power terminal 370a and a signal terminal 370b) to be electrically connected to the second sensing part 360, similarly to the first terminal portion 330 described above. The second sensing part 360 and the second terminal portion 370 may be accommodated in a separate insert body (a second insert body 380) separated from the first insert body 340 to form the second sensing module 350. For example, as illustrated in FIG. 6, the first sensing module 310 and the second sensing module 350 may be formed as separate members separated from each other.

As described above, the wheel speed sensor 100 according to an embodiment of the present disclosure is configured such that the plurality of sensing parts (the first sensing part 320 and the second sensing part 360) which operate independently of each other are accommodated in the insert bodies (the first insert body 340 and the second insert body 380) formed separately from each other. Therefore, even if moisture or the like flows into any one insert body and thus an abnormality occurs in one sensing part, the sensing part in which the abnormality occurs does not affect the other sensing part. Thus, the other sensing part can detect the rotational speed of the wheel, which makes it possible to secure the redundancy of the wheel speed sensor 100 and improve the operational reliability and lifespan of the wheel speed sensor 100.

Further, as described above, the wheel speed sensor 100 according to an embodiment of the present disclosure is configured such that end portions of the plurality of sensing modules (for example, end portions of the first terminal portion 330 and the second terminal portion 370) are exposed to the outside while accommodated in separate connector parts (for example, the first connector part 220a and the second connector part 220b) formed separately from each other. Therefore, even if moisture or the like flows into the wheel speed sensor 100 through one connector part and thus an abnormality occurs in one connector part, other connector parts can operate without affected by the abnormality. This makes it possible to further improve the redundancy and operational reliability of the wheel speed sensor 100.

Referring now to FIGS. 8 to 14, a wheel speed sensor according to another embodiment of the present disclosure is exemplarily illustrated. In the case of the embodiment illustrated in FIGS. 8 to 14, the configuration(s) of the sensing module and/or the connector part is (are) somewhat different from that (those) in the embodiment described above whereas the other portions are identical or similar to that (those) in the embodiment described above. Accordingly, only the configuration(s) of the sensing module and the connector part that are different from those in the above-described embodiment will be briefly described in below, and the description of the same configurations will be omitted. In addition, constituent elements corresponding to those in the above-described embodiment will be described using the same reference numerals.

Figure 8:
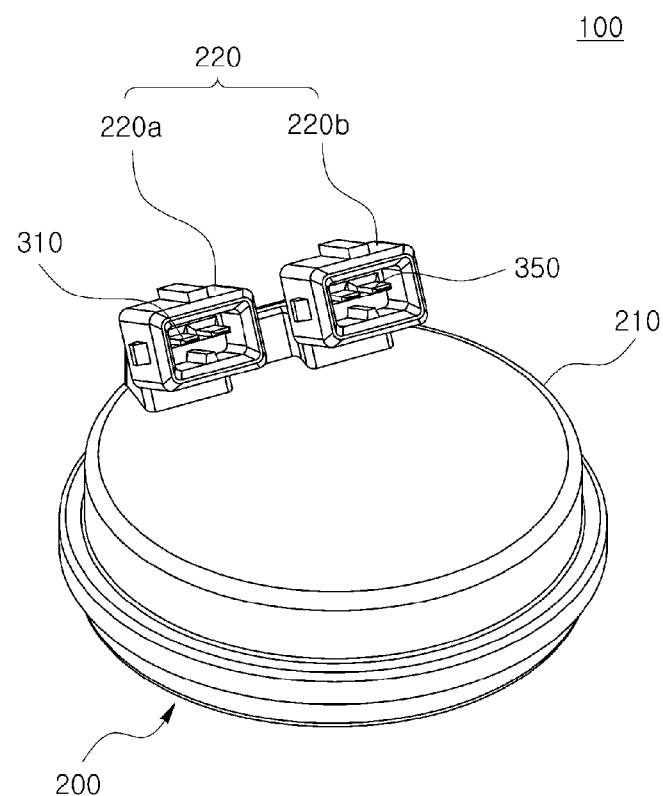
FIG. 8 exemplarily illustrates a wheel speed sensor according to another embodiment of the present disclosure.
Figure 9:
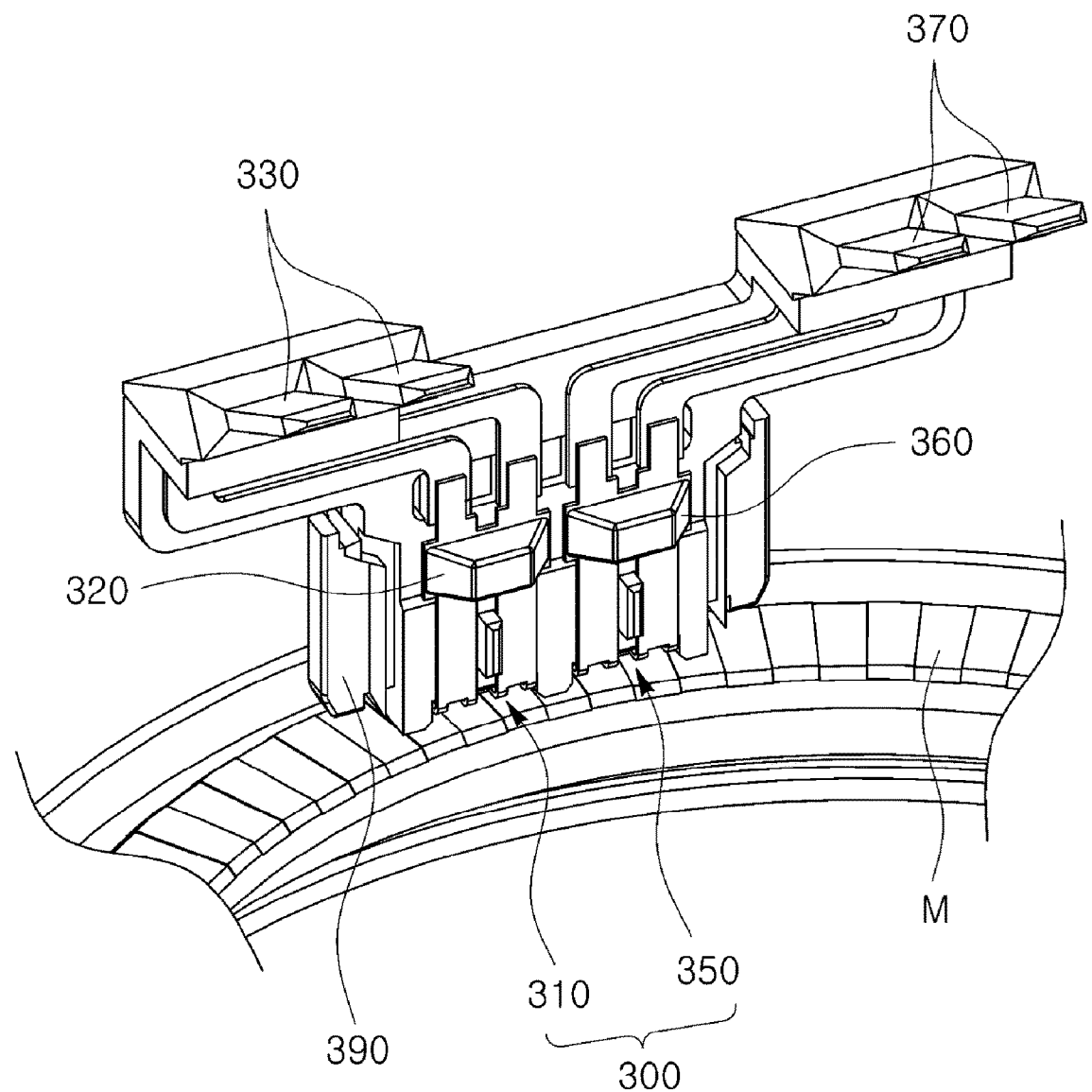
FIG. 9 illustrates a state in which a plurality of sensing modules are disposed in the wheel speed sensor illustrated in FIG. 8.
Figure 10:
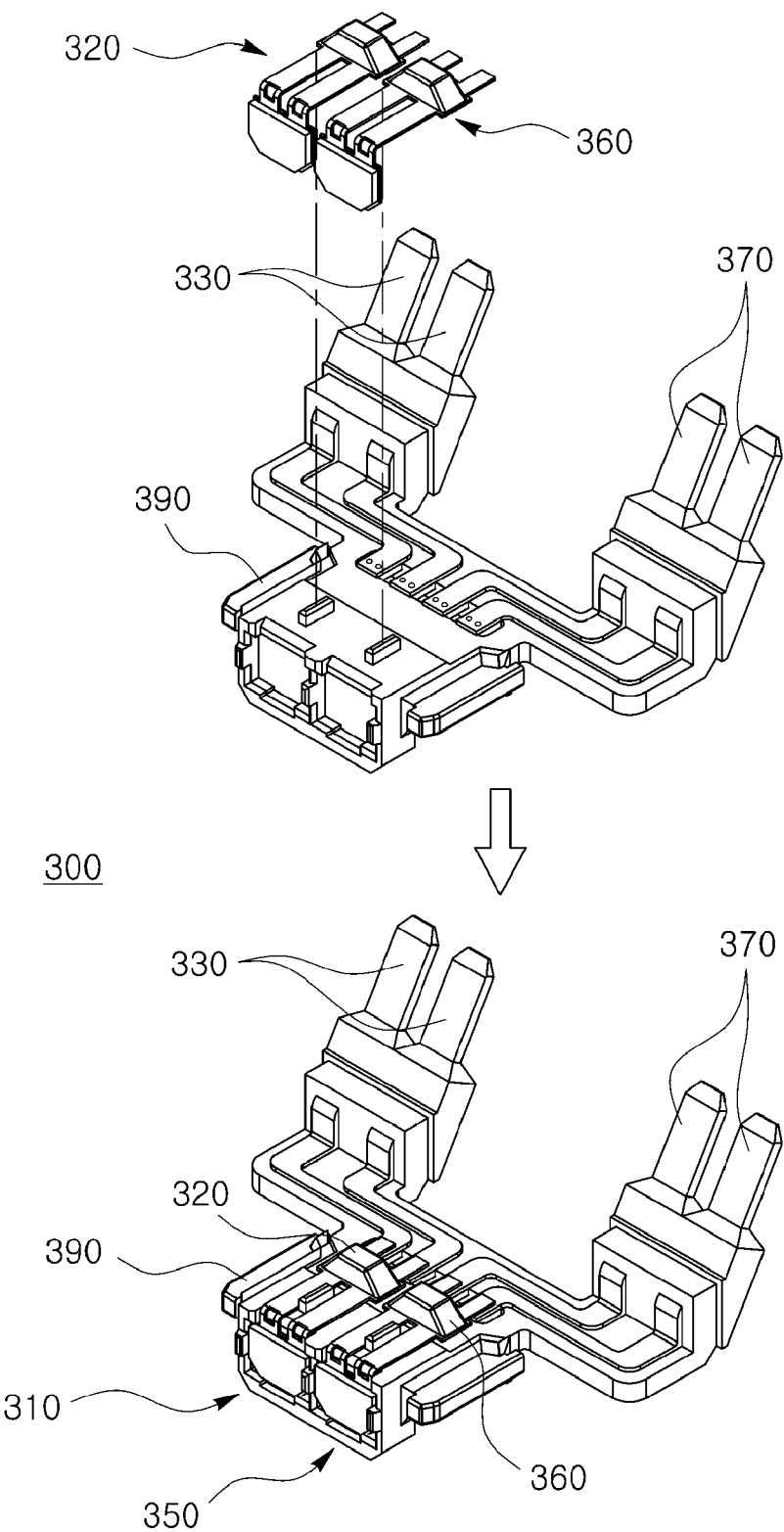
FIG. 10 exemplarily illustrates a state in which a plurality of sensing parts are accommodated in a single insert body to form a sensing module in the wheel speed sensor illustrated in FIG. 8.

Referring first to FIGS. 8 to 10, a wheel speed sensor 100 according to an embodiment of the present disclosure is exemplarily illustrated. As will be described below, the wheel speed sensor 100 according to the embodiment is different from that of the embodiment described with reference with FIGS. 3 to 7 in that the plurality of sensing parts (the first sensing part 320 and the second sensing part 360) are accommodated in one insert body.

Specifically, as illustrated in FIGS. 9 and 10, the wheel speed sensor 100 of the present embodiment is configured such that the first sensing part 320 of the first sensing module 310 and the second sensing part 360 of the second sensing module 350 are accommodated in one insert body 390.

On the other hand, the housing 200 is formed in a structure in which a plurality of connector parts 220 (a first connector part 220a and a second connector part 220b) formed separately from each other are provided in a housing body portion 210 with one side opened. One end portion of the first sensing module 310 (a first terminal portion 330) may be exposed to the outside while accommodated in the first connector part 220a, and one end portion of the second sensing module 350 (a second terminal portion 370) may be exposed to the outside while accommodated in the second connector part 220b. In this case, the first sensing part 320 and the second sensing part 360 may be accommodated and mounted in an accommodation space formed in the housing body portion 210.

As illustrated in the drawings, other constituent elements may be identical or similar to those in the above embodiment described with reference to FIGS. 3 to 7.

According to this structure, the wheel speed sensor is configured such that separate sensing parts are provided in the plurality of sensing modules and the terminals of the separate sensing parts are exposed to the outside through the plurality of connector parts formed separately from each other. Thus, as in the embodiment described with reference with FIGS. 3 to 7, it is possible to secure the redundancy of the wheel speed sensor (for example, the sensing part and the connector). Further, since the plurality of sensing parts are configured to be accommodated in a single insert body, it is possible to improve the manufacturing property and assembly task of the wheel speed sensor compared to that of the embodiment described with reference to FIGS. 3 to 7.

Figure 11:
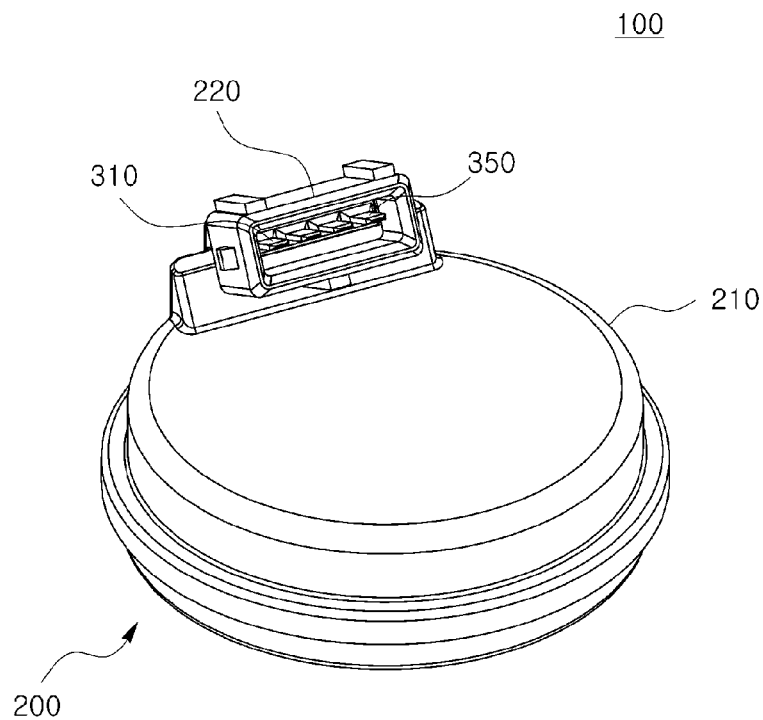
FIG. 11 exemplarily illustrates a wheel speed sensor according to still another embodiment of the present disclosure.
Figure 12:
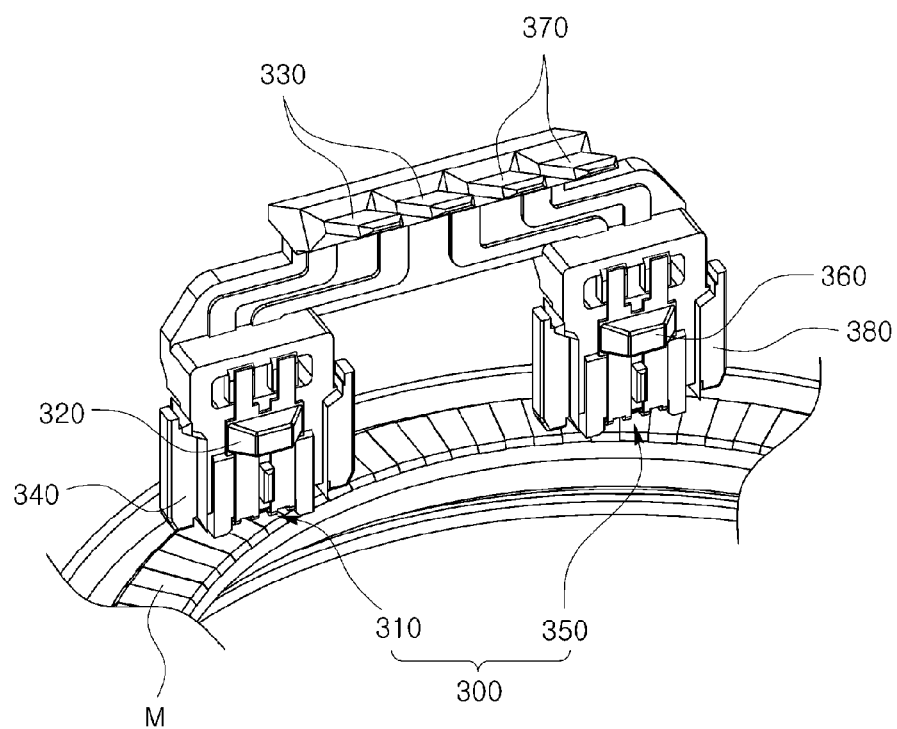
FIG. 12 exemplarily illustrates a state in which a plurality of sensing modules are disposed in the wheel speed sensor illustrated in FIG. 11.

Referring now to FIGS. 11 and 12, another embodiment of the wheel speed sensor 100 according to an embodiment of the present disclosure is exemplarily illustrated. As illustrated in the drawings, a wheel speed sensor 100 according to the present embodiment of the present disclosure is configured such that the plurality of sensing parts (the first sensing parts 320 and the second sensing part 360) are accommodated in respective insert bodies formed separately from each other (for example, the first sensing part 320 is accommodated in the first insert body 340, and the second sensing part 360 is accommodated in the second insert body 380 formed separately from the first insert body 340) as in the above embodiment described with reference to FIGS. 3 to 7. However, the wheel speed sensor 100 according to the present embodiment of the present disclosure is different from that of the above embodiment described with reference to FIGS. 3 to 7 in that end portions of the plurality of sensing modules are exposed to the outside through one connector part 220 formed in the housing 200.

That is, as illustrated in FIGS. 11 and 12, the wheel speed sensor 100 according to the present embodiment is configured such that the plurality of sensing parts (the first sensing part 320 and the second sensing part 360) which operate independently of each other are accommodated in the insert bodies (the first insert body 340 and the second insert body 380) formed separately from each other. Therefore, as in the above embodiment described with reference with FIGS. 3 to 7, even if moisture or the like flows into any one insert body and thus an abnormality occurs in one sensing part, such an abnormality occurring in the one sensing part does not affect the other sensing part. This makes it possible to secure the redundancy of the wheel speed sensor 100. Further, one end portion of the first sensing module 310 (the first terminal portion 330) and one end portion of the second sensing module 350 (the second terminal portion 370) are configured to be exposed to the outside through one connector part 220 formed in the housing 200. Thus, only one connector part 220 needs to be formed in the housing 200. This makes it possible to improve the manufacturing property of the wheel speed sensor 100 compared to the above embodiment described with reference with FIGS. 3 to 7.

Figure 13:
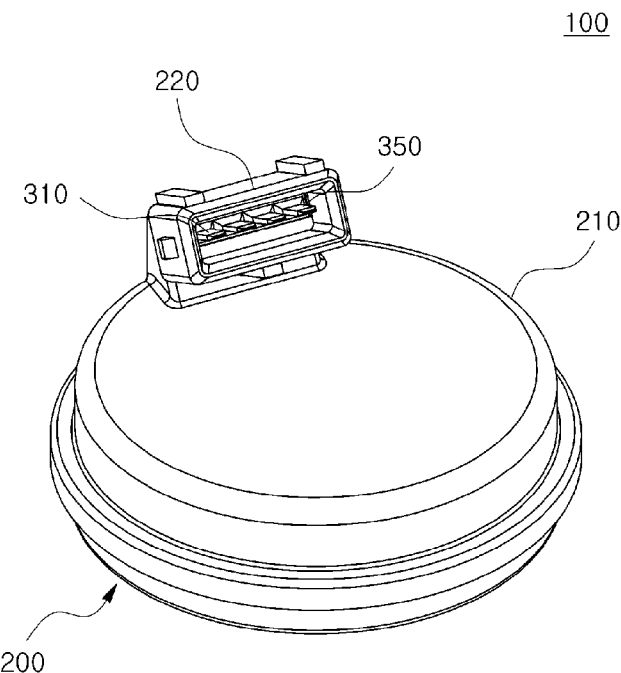
FIG. 13 exemplarily illustrates a wheel speed sensor according to yet another embodiment of the present disclosure.
Figure 14:
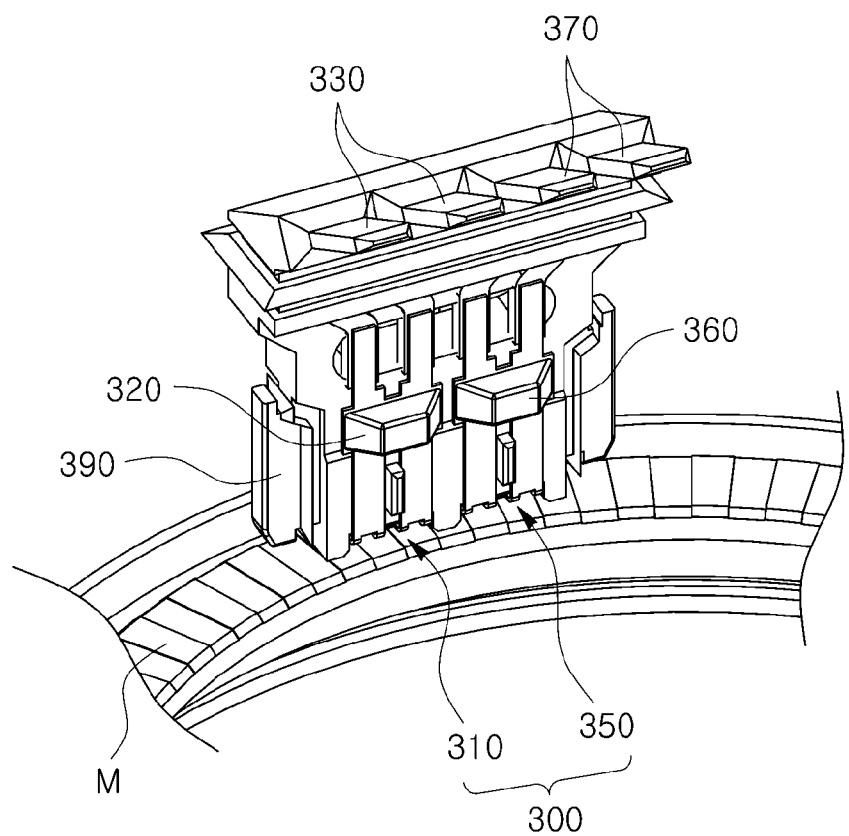
FIG. 14 exemplarily illustrates a state in which a plurality of sensing modules are disposed in the wheel speed sensor illustrated in FIG. 13.

Lastly, referring to FIGS. 13 and 14, still another embodiment of the wheel speed sensor 100 according to an embodiment of the present disclosure is exemplarily illustrated. As illustrated in the drawings, the wheel speed sensor 100 according to another embodiment of the present disclosure is different from that of the above embodiment described with reference with FIGS. 3 to 7 in that the sensing parts (the first sensing part 320 and the second sensing part 360) of the plurality of sensing modules are accommodated in one insert body, and the end portions of the plurality of sensing modules are exposed to the outside through one connector part 220 provided in the housing 200.

That is, as illustrated in FIGS. 13 and 14, the wheel speed sensor 100 of the present embodiment is configured such that the first sensing part 320 of the first sensing module 310 and the second sensing part 360 of the second sensing module 350 are accommodated in one insert body 390, and the end portions of the first sensing module 310 and the second sensing module 350 (the first terminal portion 330 and the second terminal portion 370) are exposed to the outside while accommodated in one connector part 220 formed in the housing 200.

With such a configuration, the redundancy of the wheel speed sensor can be secured by the plurality of sensing parts provided in the wheel speed sensor. Further, since the plurality of sensing parts are accommodated in one insert body, it is possible to improve the manufacturing property and assembly task of the wheel speed sensor (for example, the sensing modules of the wheel speed sensor) compared to the above embodiment described with reference with FIGS. 3 to 7. Furthermore, by providing only one connector part 220 in the housing 200, it is possible to further improve the manufacturing property of the wheel speed sensor (for example, the housing of the wheel speed sensor).

In the case of the above embodiment described with reference with FIGS. 3 to 7, the plurality of sensing parts are accommodated in the respective insert bodies formed separately from each other and the sensing modules are respectively exposed to the outside through separate connector parts. Therefore, even if moisture or the like flows into one sensing module or moisture or the like flows into one connector part and thus an abnormality occurs in the one sensing module, such an abnormality does not affect the other sensing module, thereby improving the redundancy and operational reliability of the wheel speed sensor. Whereas, in the case of the above embodiments described with reference with FIGS. 8 to 14, since the insert body in which the sensing module is accommodated and/or the connector parts of the housing are integrated with each other, it is possible to improve the manufacturing property compared to the above embodiment described with reference with FIGS. 3 to 7. However, the above embodiments described with reference with FIGS. 8 to 14 may be disadvantageous in terms of the safety and operational reliability of the wheel speed sensor compared to the above embodiment described with reference with FIGS. 3 to 7.

On the other hand, the wheel speed sensor according to an embodiment of the present disclosure described above may be used to measure a rotational speed of the wheel while mounted on the wheel bearing. More specifically, in a wheel bearing in which a rotary element mounted on a wheel is rotatably supported to a non-rotary element fixed to a vehicle body through rolling bodies, the wheel speed sensor according to an embodiment of the present disclosure may be mounted on the non-rotary element fixed to the vehicle body to sense a change in magnetic field generated due to the sensor target M (for example, encoder), which is mounted on the rotary element and rotates together with the wheel, and detect the rotational speed of the wheel.

Operational Process of the Wheel Speed Sensor According to an Embodiment of the Present Disclosure As described above, the wheel speed sensor 100 according to an embodiment of the present disclosure comprise the plurality of sensing modules (sensing parts) which operate independently of each other, and is configured such that even if an abnormality occurs in any one sensing module among the plurality of sensing modules, the rotational speed of the wheel can be detected by the other sensing module in a stable manner.

Specifically, the wheel speed sensor 100 according to an embodiment of the present disclosure may be configured to sense a change in magnetic field generated due to rotation of the sensor target (for example, an encoder) and detect the rotational speed of the wheel in real time using the plurality of sensing modules. Information about the detected rotational speed may be transmitted to the external controller such as ECU or the like and may be used to operate a control system of the vehicle.

Figure 15:
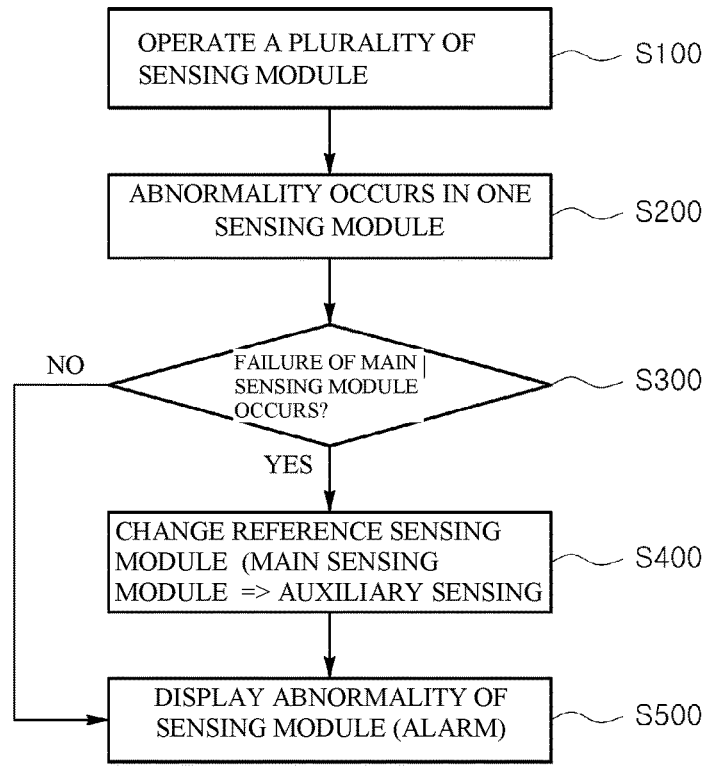
FIG. 15 exemplarily illustrates an operation process of detecting a rotational speed of a wheel using the wheel speed sensor according to an embodiment of the present disclosure.
Figure 16:
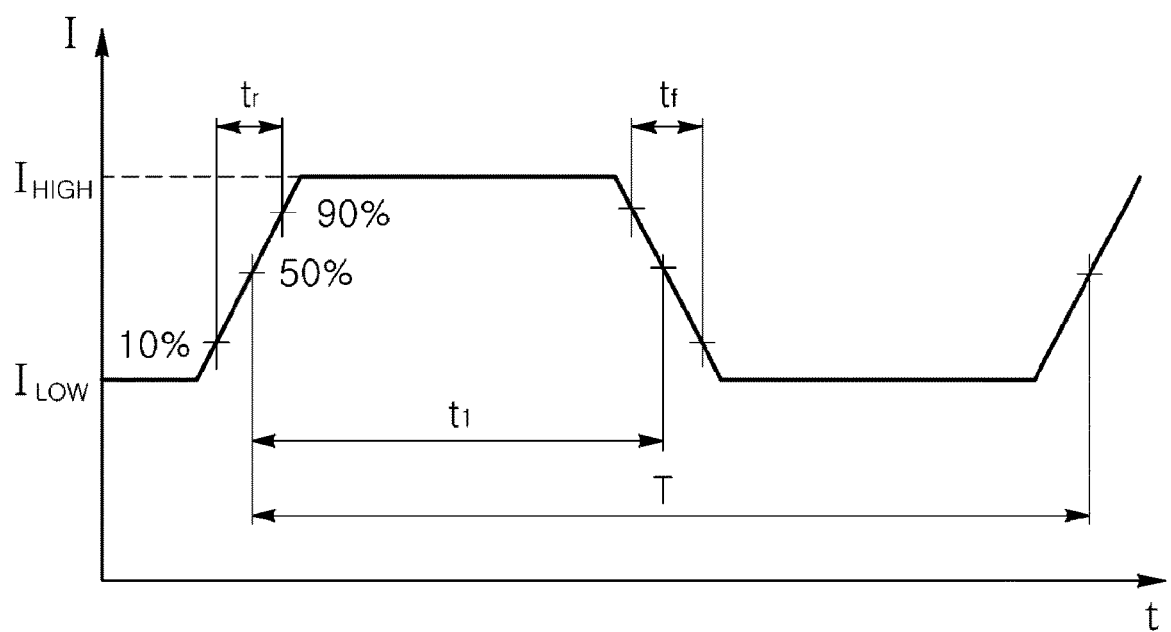
FIG. 16 exemplarily illustrates signal characteristics used for determining an abnormality of a sensing module in the wheel speed sensor according to an embodiment of the present disclosure.

For example, referring to FIG. 15, a process of detecting a rotational speed of the wheel using the wheel speed sensor 100 according to an embodiment of the present disclosure is exemplarily illustrated.

According to an embodiment of the present disclosure, the wheel speed sensor may be configured such that any one of the plurality of sensing modules (the first sensing module and the second sensing module) may be set to a main sensing module and the other may be set to an auxiliary sensing module. Further, the wheel speed sensor may be configured such that in a normal operation, a rotational speed of the wheel is detected based on a signal output from the main sensing module (for example, the first sensing module) (in step S100). In this case, all of the plurality of sensing modules provided in the wheel speed sensor may be supplied with power to detect the rotational speed of the wheel. However, the rotational speed of the wheel may be measured based on only the signal output from the main sensing module, and a signal detected by the auxiliary sensing module may be only used to determine whether or not an abnormality occurs in the wheel speed sensor.

In this process, when an abnormality occurs in any one of the plurality of sensing modules (in step S200), a controller determines whether or not such an abnormality is caused by the failure of the main sensing module (in step S300).

Here, whether or not an abnormality has occurred in any one of the plurality of sensing modules may be determined by comparing the detection signal of the main sensing module with the detection signal of the auxiliary sensing module or checking whether or not the detection signal of each sensing module falls outside a predetermined range. Further, whether or not the failure has occurred in the sensing module may be determined by checking whether a valve of the detection signal of the sensing module is not a predetermined reference value.

For example, in a determination concerning whether or not the failure of the sensing module occurs, when one or more of a maximum current value IHIGH, a minimum current value ILOW, a rising time Tr of a current value, a falling time Tf of the current value, and a duty ratio ((t1/T)*100%) in information about the detection signal transmitted from the sensing module fall outside a predetermined range, the wheel speed sensor may determine that the failure has occurred in sensing module.

When it is determined that the failure has occurred in the main sensing module, the controller may change a reference signal for measurement of the rotational speed of the wheel from the detection signal of the main sensing module to the detection signal of the auxiliary sensing module, and may measure the rotational speed of the wheel based on the detection signal of the auxiliary sensing module (in step S400). In an embodiment, a user may be notified that an abnormality has occurred in the wheel speed sensor (the main sensing module) through blinking on an instrument board (in step S500).

On the other hand, when it is determined that there is no abnormality in the main sensing module, the controller may continuously measure the rotational speed of the wheel based on the detection signal of the main sensing module. Simultaneously, the controller determines that the failure has occurred in the auxiliary sensing module and may notify the user that that abnormality has occurred in the wheel speed sensor (the auxiliary sensing module) through the blinking on the instrument board or the like (in step S500).

The above-described operational process of the wheel speed sensor according to an embodiment of the present disclosure is merely an example for explaining the wheel speed sensor according to an embodiment of the present disclosure. The wheel speed sensor according to an embodiment of the present disclosure may operate according to various other modified processes differing from the above-described operational process. As an example, in the wheel speed sensor according to an embodiment of the present disclosure, any one of the plurality of sensing modules may be set to be a main sensing module and the rotational speed of the wheel may be detected based on information about the detection signal of the main sensing module at normal times, as described above. Alternatively, the wheel speed sensor may be configured to detect the rotational speed of the wheel using a valve obtained by combining information about the detection signals transmitted from the plurality of sensing modules and averaging the same. In some embodiments, in a case in which an abnormality in a signal of one of the plurality of sensing modules is sensed, the controller may examine a signal of each sensing module to determine the presence or absence of abnormality in each sensing module. When the result of the determination is that an abnormality has occurred in any one sensing module, the rotational speed of the wheel may be measured only by another sensing module in which no abnormality occurs.

As described above, the wheel speed sensor according to an embodiment of the present disclosure comprises the plurality of sensing parts provided therein. Thus, even if an abnormality occurs in one of the plurality of sensing parts, the wheel speed sensor is configured to detect the rotational speed of the wheel by the other sensing part. This makes it possible to secure the redundancy of the wheel speed sensor and improve the operational reliability and the prolonged lifespan of the wheel speed sensor.

While the present disclosure has been described above by way of particular features such as specific constituent elements and the like, and exemplary embodiments, these embodiments are provided to further facilitate overall understanding of the present disclosure, and the present disclosure is not limited thereto. Various modifications and variations may be made from the above descriptions by those skilled in the art.

For example, in the cases of the above-described embodiments, the wheel speed sensor has been described and illustrated to comprise two sensing parts, the wheel speed sensor according to an embodiment of the present disclosure may be configured to comprise three or more sensing parts. In some embodiments, a sensor such as an acceleration sensor, a temperature sensor or the like may be provided instead of the wheel speed sensor or in addition to the wheel speed sensor.

Therefore, the spirit of the present disclosure should not be limited to the above-described embodiments, and not only the append claims but also all those modified equally or equivalently to the claims are intended to fall within the scope of the spirit of the present disclosure.

What is claimed is:

1. A wheel speed sensor mounted on a wheel bearing to detect a rotational speed of a wheel, comprising:
   a housing;
   a first sensing module configured to detect a rotational speed of the wheel and to output a first detection signal to an outside; and
   a second sensing module configured to detect the rotational speed of the wheel independently of the first sensing module and to output a second detection signal to the outside,
   wherein the first sensing module comprises a first sensing part configured to detect a rotational speed of the wheel, and the second sensing module comprises a second sensing part configured to detect the rotational speed of the wheel,
   wherein the housing includes a housing body portion formed in a cylindrical cap shape with one side opened and a connector part positioned on one side of the housing body portion;
   the first sensing part and the second sensing part include a sensor disposed adjacent to a sensor target mounted on a rotary element of the wheel bearing and configured to sense a change in magnetic field and a plurality of lead terminals extending from the sensor;
   the first sensing module further includes a first terminal portion electrically connected to the first sensing part, and the second sensing module further includes a second terminal portion electrically connected to the second sensing part; and
   the first sensing module and the second sensing module are provided in the housing, and the first sensing module and the second sensing module are separated from each other in a circumferential direction of the housing, and
   wherein the first sensing part of the first sensing module is accommodated in a first insert body;
   the second sensing part of the second sensing module is accommodated in a second insert body;
   the first insert body and the second insert body are formed separately from each other; and
   the first sensing module and the second sensing module are configured such that end portions thereof are exposed to the outside through one connector part formed in the housing.

2. The wheel speed sensor of claim 1, wherein the sensor provided in each of the first sensing part and the second sensing part comprises any one of a Hall sensor, an anisotropic magneto-resistance (AMR) sensor, and a giant magneto-resistance (GMR) sensor.

3. The wheel speed sensor of claim 1, wherein the first sensing module further comprises a first terminal portion electrically connected to the first sensing part, and
   the second sensing module further comprises a second terminal portion electrically connected to the second sensing part.

4. The wheel speed sensor of claim 3, wherein each of the first terminal portion and the second terminal portion comprises a power terminal and a signal terminal, and
   any one lead terminal of a plurality of lead terminals provided in each of the first sensing part and the second sensing part is electrically connected to the power terminal provided in each of the first terminal portion and the second terminal portion, and the other lead terminal of the plurality of lead terminals provided in each of the first sensing part and the second sensing part is electrically connected to the signal terminal provided in each of the first terminal portion and the second terminal portion.

5. A wheel bearing comprising:
   the wheel speed sensor of claim 1.

6. The wheel bearing of claim 5, wherein the wheel bearing is configured to rotatably support the rotary element on which the wheel is mounted relative to a non-rotary element connected to a vehicle body through rolling bodies.

7. The wheel bearing of claim 6, wherein the wheel speed sensor is mounted on and fixed to the non-rotary element connected to the vehicle body.

8. The wheel bearing of claim 7, further comprising:
   a sensor target mounted on the rotary element of the wheel bearing to generate a change in magnetic field while rotating together with the wheel.

* * * * *